(12) United States Patent
Asami

(10) Patent No.: US 6,609,631 B2
(45) Date of Patent: Aug. 26, 2003

(54) TWO SHAFT TYPE OPENING AND CLOSING MECHANISM FOR CONTAINER WITH COVER

(75) Inventor: Goro Asami, Utsunomiya (JP)

(73) Assignee: Nifco Inc., Yokohama (JP)

( * ) Notice: Subject to any disclaimer, the term of this patent is extended or adjusted under 35 U.S.C. 154(b) by 40 days.

(21) Appl. No.: 09/892,463

(22) Filed: Jun. 28, 2001

(65) Prior Publication Data

US 2002/0005411 A1 Jan. 17, 2002

(30) Foreign Application Priority Data

Jul. 3, 2000 (JP) .................................. 2000-201087

(51) Int. Cl.[7] ............................................. B65D 43/14
(52) U.S. Cl. ...................... 220/817; 312/322; 296/24.1; 220/811; 220/263
(58) Field of Search ..................... 296/24.1; 224/926; 220/263, 264, 815, 817, 827, 829, 830, 845, 811, 812, 832, 833; 16/366, 287, 286; 49/386; 312/327, 328, 324

(56) References Cited

U.S. PATENT DOCUMENTS

| | | | | |
|---|---|---|---|---|
| 2,439,132 A | * | 4/1948 | Hatala et al. ................ | 220/264 |
| 4,854,233 A | * | 8/1989 | Despot et al. ............... | 101/216 |
| 5,520,313 A | * | 5/1996 | Toshihide ..................... | 220/815 |
| 5,620,122 A | * | 4/1997 | Tanaka .......................... | 220/264 |
| 5,718,405 A | * | 2/1998 | Adachi .......................... | 224/926 |
| 5,893,478 A | * | 4/1999 | Maruoka ....................... | 220/264 |

FOREIGN PATENT DOCUMENTS

JP 8-156698 6/1996

* cited by examiner

Primary Examiner—Robin A. Hylton
(74) Attorney, Agent, or Firm—Kanesaka & Takeuchi

(57) ABSTRACT

In a two-shaft pivotal mechanism for opening/closing and supporting a cover, a second pivot shaft connecting a pivoting member and the cover projects integrally from one of a pivoting member and a connecting piece on the cover, and an attachment hole for supporting the second pivot shaft is formed in the other of the pivoting member and the connecting piece, so that the pivoting member and connecting piece are pivotally connected. The pivot limiting portion is provided between the connecting piece and the pivoting member, and limits pivotal operation therebetween to a predetermined angular range. A first pivot shaft connecting the pivoting member and a receptacle projects integrally from one of the pivoting member and the receptacle, and an attachment hole for supporting the first pivot shaft is formed in the other of the pivoting member and the receptacle, so that the pivoting member and the receptacle are pivotally connected.

7 Claims, 6 Drawing Sheets

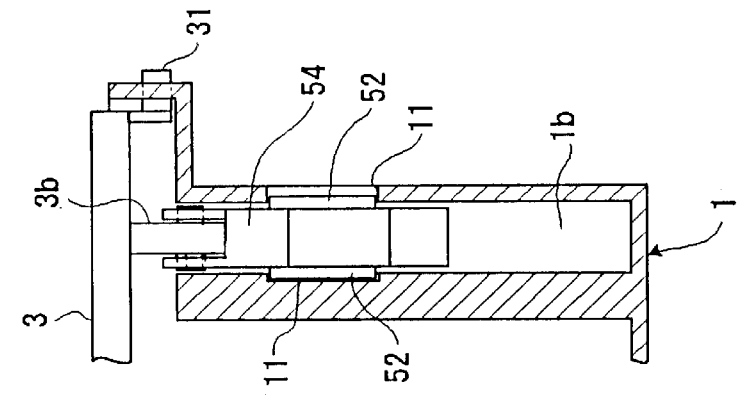
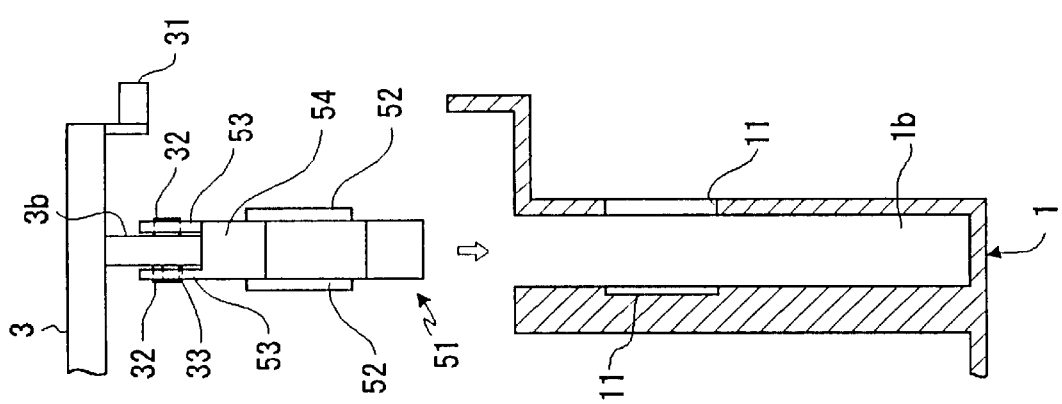
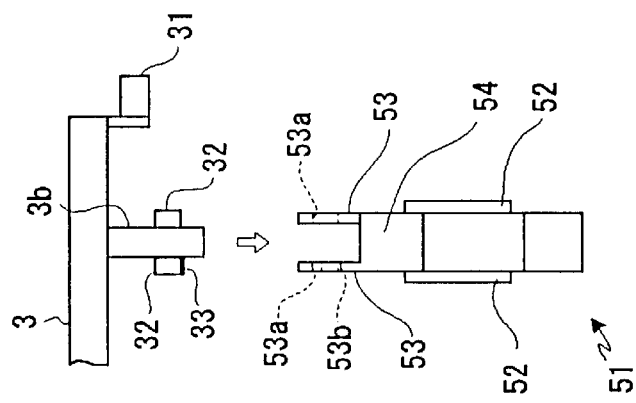

TWO SHAFT TYPE OPENING AND CLOSING MECHANISM FOR CONTAINER WITH COVER

BACKGROUND OF THE INVENTION AND RELATED ART STATEMENT

The present invention relates to a mechanism for opening/closing and supporting a cover, which is suitably used for opening and closing an opening of a receptacle used in a vehicle such as a storage compartment, a cup holder or the like, and in particular, to a two shaft type opening and closing mechanism for a container with a cover, which can be easily attached to the container or receptacle and the cover.

Conventionally, receptacles such as cup holders, storage compartments, and the like have been set at a center console or the like in a vehicle. A cover for opening and closing the opening of the receptacle is provided at the receptacle.

In the cover provided at the receptacle, generally, one edge portion thereof is pivotally attached to one edge portion of a receptacle main body, such that the cover opens and closes in a flap-like manner. Thus, it is required to provide a space above the receptacle main body which corresponds to the locus of pivoting of the distal end of the cover, accompanied by the opening and closing of the cover. Further, it is required to provide a space at one end side of the receptacle main body for the cover to be positioned at the time when the cover is in a completely open state with respect to the receptacle main body. Thus, it has not been easy to ensure the space for setting the conventional receptacle having a cover within a vehicle where space is limited.

In order to overcome this drawback, the mechanism for opening/closing a cover which is illustrated in FIG. 5 was proposed (Japanese Patent Application Laid-Open (JP-A) No. 8-156698). As shown in FIG. 5, a pivoting member 2 is pivotally supported at a pivot shaft 11 which projects at an outer side surface of a receptacle main body 1. A guide hole 12, which is formed in a circular-arc shape along the locus of pivoting of the pivoting member 2, and a forked-off hole 13, which is branched outwardly from the guide hole 12, are formed in the side surface of the receptacle main body 1. First slide shafts 31 are provided at both side portions of a cover 3 (only one side portion is shown in FIG. 5), and each shaft 31 is inserted through the guide hole 12 from the inner side of the receptacle main body 1 and is pivotally attached to the pivoting member 2. Further, at both side portions of the cover 3 (only one side portion is shown in FIG. 5), second slide shafts 32 are arranged parallel to the first slide shaft 31, and each shaft 32 is inserted through the guide hole 12 from the inner side of the receptacle main body 1 and is inserted into a cut-in groove 21 formed in the pivoting member 2. The cover 3 is urged by a torsion spring s which is attached between the second slide shaft 32 and a projection 14 provided between the guide hole 12 and the pivot shaft 11.

Operations of opening and closing the cover 3 by the opening/closing mechanism are shown in FIGS. 6A through 6D.

In a closed state in which the opening of the receptacle main body 1 is closed by the cover 3, as shown in FIG. 6A, the first slide shaft 31 is positioned at one end (the upper left end in the figure) of the guide hole 12, and the second slide shaft 32 is positioned at the distal end portion of the branched hole 13. In this state, the cover 3 is urged in the closing direction by the torsion spring s (not shown in the figures), such that the closed state is maintained.

When the cover 3 is pivoted from this closed state in the opening direction (toward the upper right in the figures) against the urging force of the torsion spring s, as shown in FIG. 6B, first, the cover 3 pivots around the first slide shaft 31, and the second slide shaft 32 enters into the guide hole 12 from the distal end portion of the branched hole 13. Then, as shown in FIG. 6C, the first slide shaft 31 and the second slide shaft 32 move within the guide hole 12 toward the other end side thereof (the lower right side in the figures), the pivoting member 2 pivots around the pivot shaft 11, and the cover 3 pivots around the pivot shaft 11 in the direction of opening. As shown in FIG. 6D, when the second slide shaft 32 abuts against the other end of the guide hole 12, the cover 3 reaches the limit, and the opening of the receptacle main body 1 is opened. In this case, at the time of the operations from FIGS. 6B through FIG. 6D, the urging force of the torsion spring s works in a direction of pivoting the cover 3 in the opening direction. Due to this urging force, the cover 3 pivots automatically, and is maintained in the completely open state shown in FIG. 6D.

Further, when the cover 3 is to be closed from the open state of FIG. 6D, by pivoting the cover 3 in the closing direction (toward the upper left in the figures) against the urging force of the torsion spring s, as shown in FIG. 6C, first, the first slide shaft 31 and the second slide shaft 32 move along the guide hole 12 toward the one end thereof, the pivoting member 2 pivots around the pivot shaft 11, and the cover 3 pivots around the pivot shaft 11. When the first slide shaft 31 reaches the one end of the guide hole 12 as shown in FIG. 6B, as shown in FIG. 6A, the second slide shaft 32 enters into the branched hole 13 from the guide hole 12 and moves toward the distal end of the branched hole 13, and the cover 3 pivots around the first slide shaft 31 such that the opening of the receptacle main body 1 is closed. In this case, at the time of the operations from FIGS. 6B to FIG. 6A, the urging force of the torsion spring s is applied in the direction of pivoting the cover 3 in the closing direction. Due to this urging force, the cover 3 automatically pivots, and the closed state shown in FIG. 6A is maintained.

In this way, the mechanism for opening/closing a cover operates such that, by using two shafts which are the first slide shaft 31 and the pivot shaft 11 as the pivot shafts for pivoting the cover 3, the space required for opening and closing the cover 3 is small, and the space for providing the receptacle within the vehicle can easily be ensured.

However, in this mechanism for opening/closing the cover, in order to carry out the operation of pivoting the cover 3 around the first slide shaft 31 and the pivot shaft 11 on a predetermined locus, the guide hole 12 must be formed in the side surface of the receptacle main body 1 and the second slide shaft 32 must be provided on the cover 3. Further, because of the structure in which the first and second slide shafts 31, 32 are formed separately from the cover 3, the number of structural parts is large and the operations for assembling the respective parts are complex.

Further, the operations for assembling the parts are complex. For example, after the first and second slide shafts 31, 32 provided at the cover have been inserted into the guide hole 12 from the inner side of the receptacle main body 1, the first and second slide shafts 31, 32 must be pivotally attached to the pivoting member 2, and the first and second slide shafts 31, 32 must be inserted into the cut-in groove 21 provided at the pivoting member 2 and the cover 3 must be assembled to the pivoting member 2.

Moreover, there is a need to reduce the operation load at the time of the opening and closing operations of the cover 3, which is caused by the great friction generated between the second slide shaft 32 and the guide hole 12. Thus, grease for lubrication must be applied to the second slide shaft 32 or to the inner peripheral surface of the guide hole 12 to reduce the frictional resistance therebetween. Thus, there is a problem that this makes the work for assembling the cover 3 to the receptacle main body 1 complex.

In view of the aforementioned problems, an object of the present invention is to facilitate the assembly work of a cover to a receptacle main body, in a two-shaft pivoting-type mechanism for opening/closing the cover.

SUMMARY OF THE INVENTION

In order to achieve the above object, the present invention provides a mechanism for opening/closing and supporting, i.e. opening and closing, a cover. The mechanism pivotally supports the cover to a body to be opened and closed, such as a receptacle, and is a two-shaft type mechanism for opening and closing the cover, wherein a pivoting member is pivotally attached to the body to be opened and closed, the cover is pivotally supported at the pivoting member, the pivoting member and the cover are pivoted around a first pivot shaft which connects the pivoting member and the body to be opened and closed, and the cover is pivoted with respect to the pivoting member around a second pivot shaft which is pivotally supported between the pivoting member and the cover, such that the cover is opened and closed. The second pivot shaft projects integrally from one of the pivoting member and a connecting piece formed at the cover, an attachment hole which supports the second pivot shaft is formed in the other of the pivoting member and the connecting piece, both members are pivotally connected, a pivoting limiting portion is provided between both members and limits pivoting operation of both members to a predetermined angular range, the first pivot shaft projects integrally from one of the pivoting member and the body to be opened and closed, an attachment hole which supports the first pivot shaft is formed in the other of the pivoting member and the body to be opened and closed, and both members are pivotally connected.

In the mechanism for opening and closing the cover, by pivoting the cover in the opening direction from the closed state in which the body is closed by the cover, the cover pivots around the second pivot shaft. When the cover is pivoted by a predetermined angle, the pivoting of the cover around the second pivot shaft is stopped due to operation of the pivoting limiting portion. Thereafter, the cover pivots together with the pivoting member around the first pivot shaft, and the top surface opening of the body is opened. By pivoting the cover in the closing direction from this open state, the cover together with the pivoting member pivots around the first pivot shaft. Thereafter, the cover pivots around the second pivot shaft away from the first pivot shaft, and closes the top surface opening of the body. By pivoting the cover around the first and second pivot shafts, the space required for the pivoting movement of the cover is small, and it is easy to ensure a sufficient space for setting the body.

The assembling of the cover to the body by the mechanism for opening and closing the cover is carried out as follows. The second pivot shaft, which projects integrally from one of the pivoting member and the connecting piece of the cover, is inserted into the attachment hole formed in the other of the pivoting member and the connecting piece, and the cover and the pivoting member are pivotally connected. The first pivot shaft, which projects integrally from one of the pivoting member and the body, is inserted into the attachment hole formed in the other of the pivoting member and the body, and the pivoting member and the body are pivotally connected. In this way, the cover is attached to the body, so as to be pivotable around the first and second pivot shafts.

The second pivot shaft projects integrally from one of the connecting piece of the cover and the pivoting member. The first pivot shaft projects integrally from one of the pivoting member and the body. Thus, there is no specific work for attaching the first and second pivot shafts to the respective members, and the work for attaching the members can be carried out easily.

Further, one of the second pivot shaft and the attachment hole may be provided at both side surfaces of the connecting piece of the cover, and the other of the second pivot shaft and the attachment hole may be provided at a pair of plate-shaped bodies formed at the pivoting member, and one of the first pivot shaft and the attachment hole may be provided at the pivoting member, and the other of the first pivot shaft and the attachment hole may be provided at a pair of wall portions formed at the body.

In accordance with this structure, the connecting piece of the cover is inserted between the pair of plate-shaped bodies of the pivoting member, the connecting piece is nipped from both side surfaces thereof by the plate-shaped bodies, and the second pivot shaft is inserted into the attachment hole. In this way, the pivoting member is pivotally attached to the cover so as to be pivotable around the second pivot shaft. Further, the pivoting member is inserted between the pair of wall portions of the body, and the first pivot shaft is inserted into the attachment hole. In this way, the pivoting member is pivotally attached to the body so as to be pivotable around the first pivot shaft. Thus, by the simple operations of inserting one of the connecting piece of the cover and the pivoting member between the plate-shaped bodies which are provided at the other of the connecting piece of the cover and the pivoting member, and inserting the pivoting member between the pair of wall portions of the body, the cover can be pivotally attached to the body so as to be pivotable around the first and second pivot shafts. Accordingly, the work for attaching the cover to the body can easily be carried out. In particular, in the case of setting a receptacle at a place where the setting work is difficult, such as the center console or the like in a vehicle, after the pivoting member is attached in advance to the cover, the pivoting member can be attached to the receptacle main body, and the work for setting the receptacle can be carried out easily.

Moreover, the pivoting limiting portion may limit pivoting operation of both members around the second pivot shaft to a predetermined angular range, due to portions of the cover and the pivoting member abutting against each another.

In accordance with this structure, when the cover is pivoted by a predetermined angle around the second pivot shaft, a portion of the cover abuts against a portion of the pivoting member. The pivoting of the cover around the second pivot shaft is thereby stopped. Thereafter, the cover, together with the pivoting member, pivots around the first pivot shaft. In this way, due to the respective portions of the cover and the pivoting member abutting against each another, the center of pivoting of the cover moves from the second pivot shaft to the first pivot shaft. Thus, even if the support shaft and the guide hole are not provided at the cover and the body, the cover pivots on a predetermined locus, and the number of structural parts can thereby be kept low.

Further, the mechanism for opening and closing the cover may include urging means structured so as to urge the pivoting operation of the cover with respect to a predetermined angle at the time of opening and closing the cover. In accordance with this structure, due to the urging force of the urging means, the position of the cover with respect to the body in the open state and in the closed state can be maintained, and rattling of the cover with respect to the body can be prevented. Moreover, after the cover has been pivoted for the predetermined angle, the cover automatically pivots to the completely open or completely closed state due to the urging force of the urging means. Thus, the operations of opening and closing the cover can be carried out easily.

Moreover, the first pivot shaft may be formed from a cylindrical body which has a short axis and is formed so as to pivot while an outer peripheral surface of the cylindrical body slides along an inner peripheral surface of the attachment hole. In accordance with this structure, by making the diameter of the attachment hole large, the surface area of contact between the attachment hole and the first pivot shaft can be made to be large. Accordingly, the load applied to the first pivot shaft at the time of opening and closing the cover is received over a wide surface area, and breakage of the attachment hole and the first pivot shaft can be prevented.

BRIEF DESCRIPTION OF THE DRAWINGS

FIGS. 4A through 4C are views illustrating in order the operations at the time of attaching the cover to the receptacle main body by the mechanism for opening/closing and supporting the cover;

DETAILED DESCRIPTION OF PREFERRED EMBODIMENTS

Hereinafter, embodiments will be described in order to describe the present invention more concretely.

Figure 1:
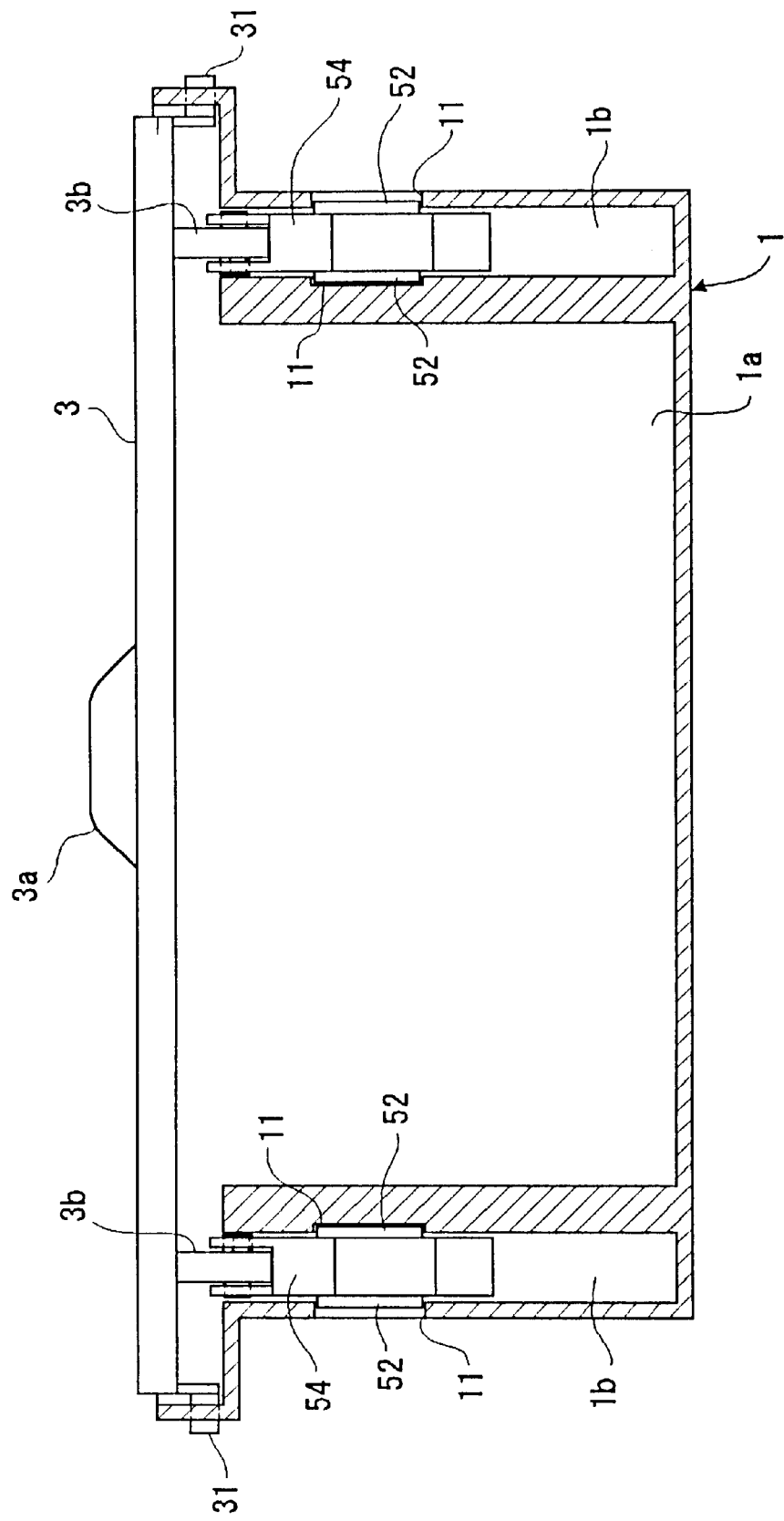
FIG. 1 is a schematic sectional view showing a receptacle in which a cover is attached to a receptacle main body by a mechanism for opening/closing and supporting a cover relating to an embodiment of the present invention.
Figure 2:
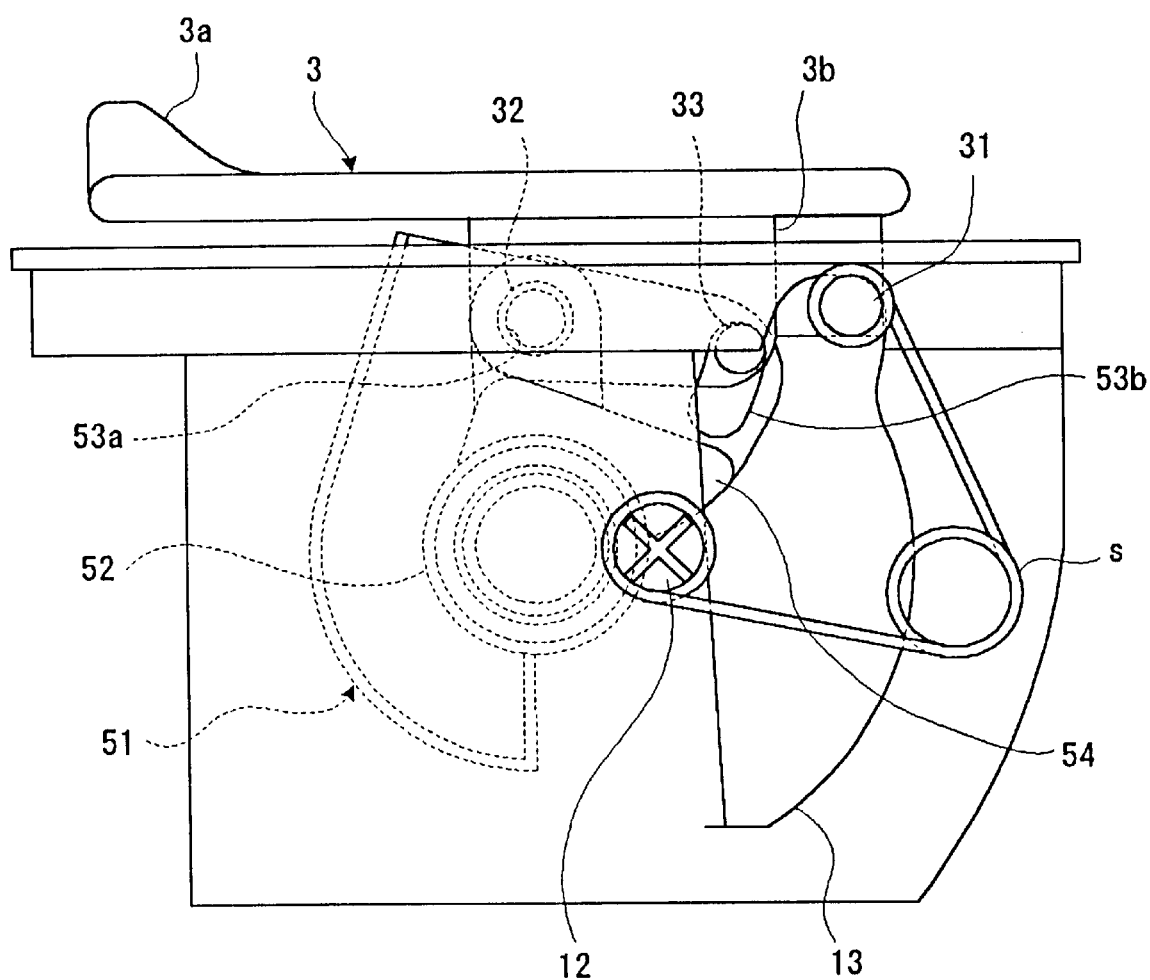
FIG. 2 is a schematic side view showing the receptacle.

FIGS. 1 and 2 show a receptacle, in which a cover 3 is attached to a receptacle main body 1 by a mechanism for opening/closing and supporting the cover, i.e. opening and closing mechanism, relating to an embodiment of the present invention. As shown in FIGS. 1 and 2, the opening and closing mechanism for the cover is formed by second pivot shafts 32 and slide shafts 33 which are formed at both transverse side portions of the receptacle main body 1 integrally formed with the cover 3, support shafts 31 projecting at both transverse side surfaces of a base end portion of the cover 3, arm members 51 which are pivotally supported by the second pivot shafts 32, pivot holes 11 at which the arm members 51 are pivotally supported, projections 12 projecting at both transverse side surfaces of the receptacle main body 1, support shaft guide holes 13 which are formed in both side surfaces of the receptacle main body 1 along loci of pivoting of the support shafts 31, pivoting of which accompanies the pivoting movement of the cover 3 around first and second pivot shafts 52, 32, and torsion springs s urging the cover 3 in an opening direction and a closing direction.

The second pivot shafts 32 project from both side surfaces of connecting pieces 3b which are formed in substantially rectangular block shapes at transverse side end portions of the rear surface of the cover 3. The slide shafts 33 project from one side surface of the corresponding connecting piece 3b, and are formed integrally with the cover 3.

The arm member 51 is structured integrally by the following: the first pivot shaft 52 shaped as a cylinder and having a short axis, a pair of nipping pieces 53 which project outwardly in plate shapes from the vicinities of both axial end portions of the first pivot shaft 52, insert-through holes 53a formed in the nipping pieces 53 opposing to one another, a guide hole 53b formed in a circular-arc shape in one of the nipping pieces 53 along the locus of pivoting of the slide shaft 33, pivoting of which accompanies by the pivoting movement of the cover 3 around the second pivot shafts 32, and an abutment portion 54 projecting in a block shape from the outer peripheral surface of the first pivot shaft 52.

The pivot holes 11 are formed at opposing side walls forming arm receiving chambers 1b, which are provided at both sides of a cup receiving chamber 1a of the receptacle main body 1 for receiving a receptacle such as a cup or the like. The arm members 51 received in the arm receiving chambers 1b are pivotally supported in the pivot holes 11.

The mechanism for opening and closing the cover are assembled as follows. The second pivot shafts 32 and slide shafts 33 provided at the connecting pieces 3b of the cover 3 are inserted into the insert-through holes 53a and guide holes 53b of the arm members 51. The first pivot shafts 52 of the arm members 51 are inserted into the pivot holes 11 of the arm receiving chambers 1b, and the support shafts 31 of the cover 3 are inserted into the support shaft guide holes 13 of the receptacle main body 1. One end of each torsion spring s is attached to the projection 12 of the receptacle main body 1, and the other end is attached to the support shaft 31 of the cover 3.

In this case, the cover 3 pivots around the second pivot shafts 32 with respect to the arm members 51, and the slide shafts 33 accordingly move within the guide holes 53b. Further, the arm members 51 pivot around the first pivot shafts 52 with respect to the receptacle main body 1. The cover 3 is thereby supported at the receptacle main body 1 so as to pivot around the first and second pivot shafts 52, 32.

Operations of opening and closing the cover 3 supported at the receptacle main body 1 by using the mechanism for opening and closing the cover structured in this way will now be described. The receptacle is set in a closed state, in which the top surface opening of the receptacle main body 1 is closed, or in an open state, in which the top surface opening is opened. The cover 3 is moved by fingers placed on a finger placement portion 3a of the cover 3 with respect to the receptacle main body 1.

Figure 3:
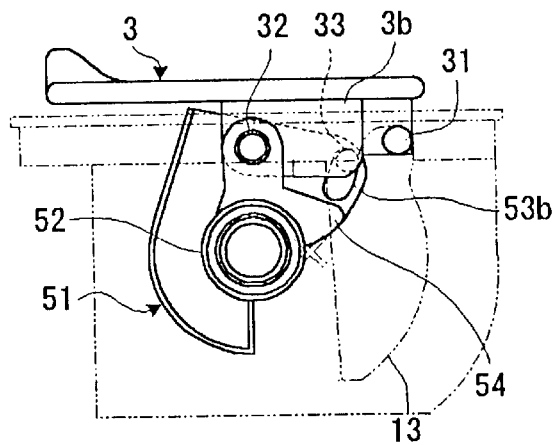
FIGS. 3A through 3E are schematic side views showing operations of opening and closing the cover attached to the receptacle main body by the mechanism for opening/closing and supporting a cover, and illustrate in order the operations from a completely closed state to a completely open state of the cover.
Figure 3:
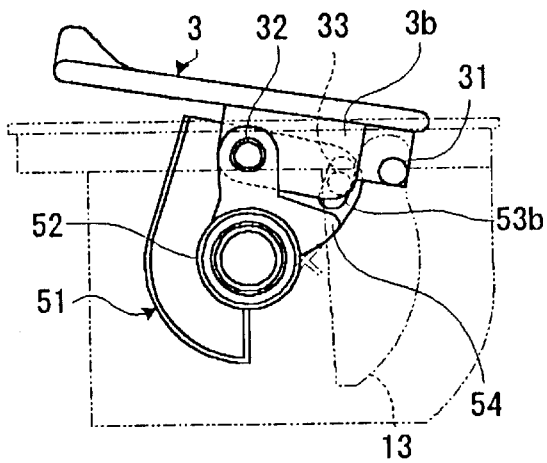
Figure 3:
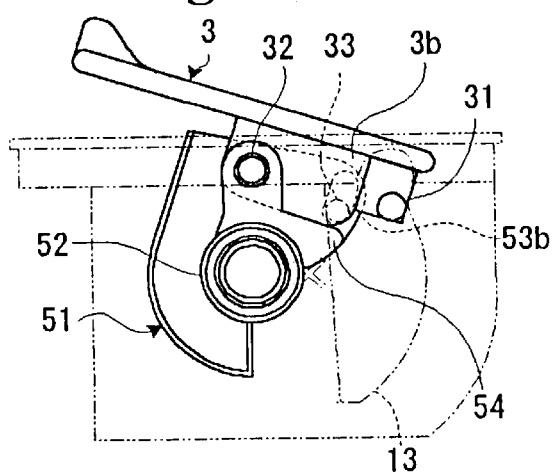
Figure 3:
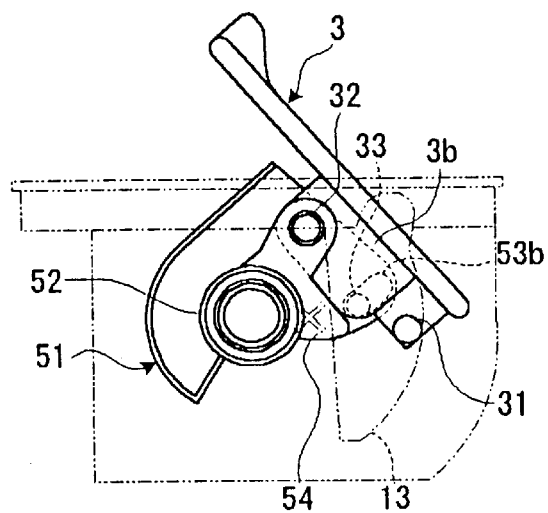
Figure 3:
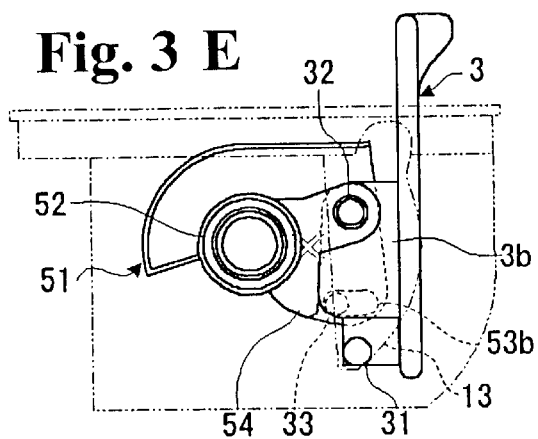
Figure 5:
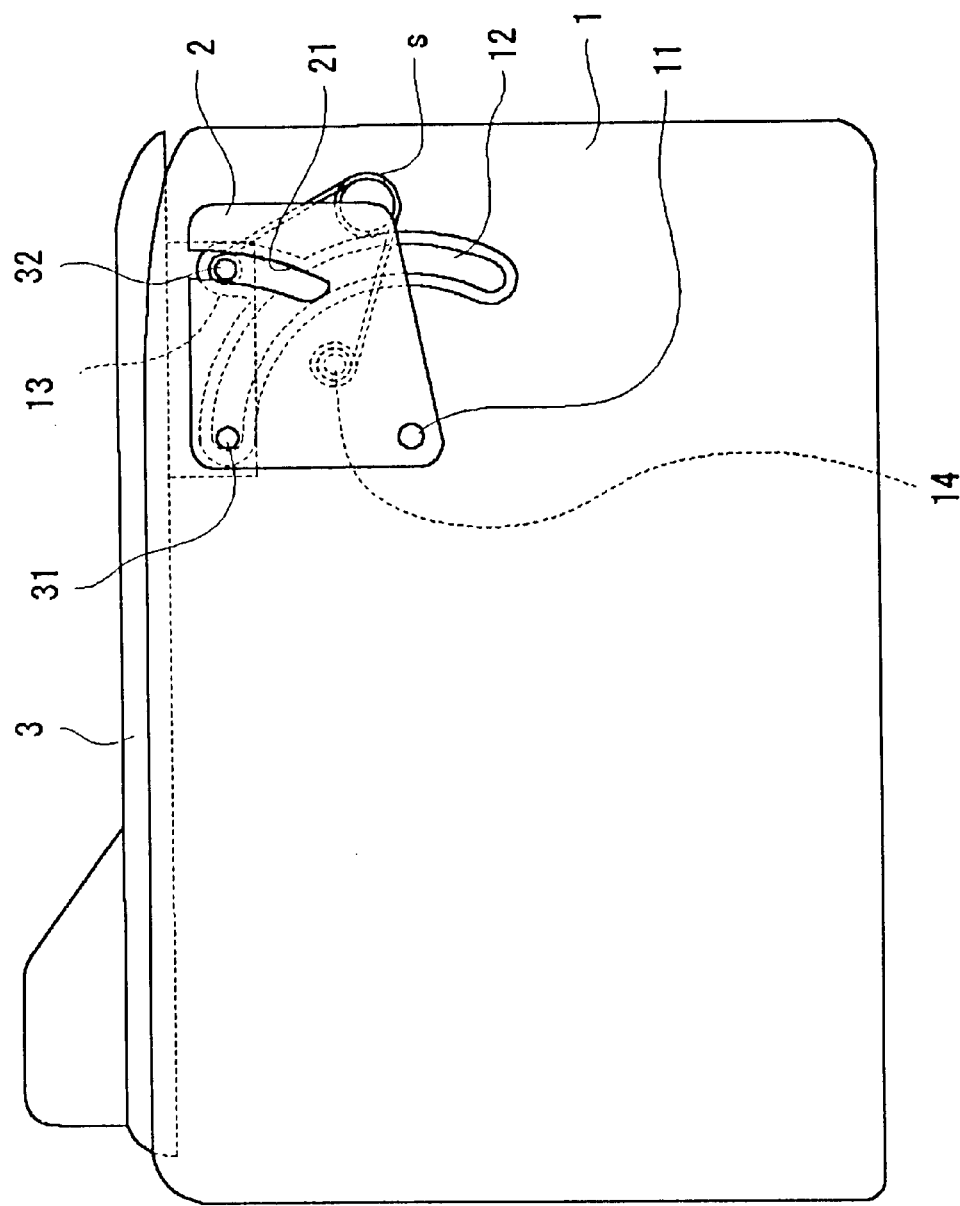
FIG. 5 is a schematic side view showing a receptacle at which the cover is attached to the receptacle main body by a conventional mechanism for opening/closing and supporting the cover.
Figure 6A:
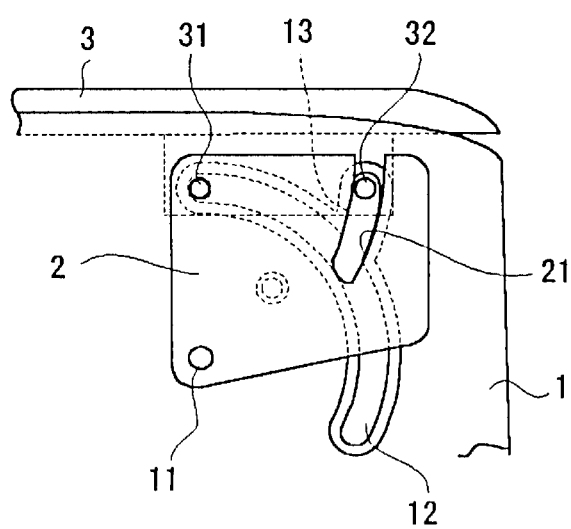
FIGS. 6A through 6D are schematic side views showing operations of opening and closing the cover attached to the receptacle main body by the mechanism for opening/closing and supporting the cover of FIG. 5, and illustrate in order the operations from a completely closed state to a completely open state of the cover.
Figure 6B:
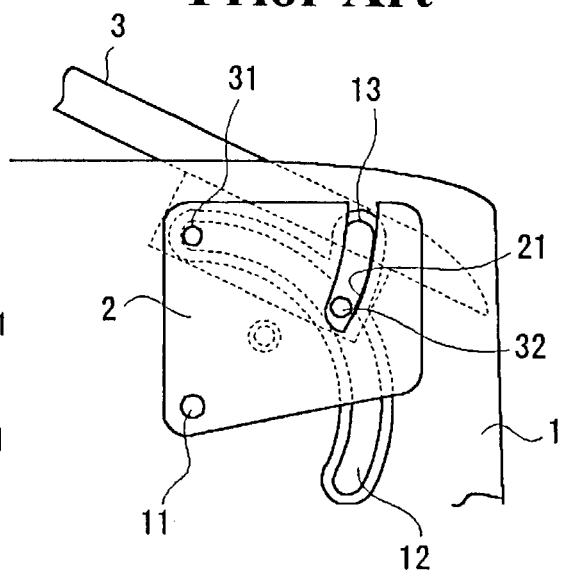
Figure 6C:
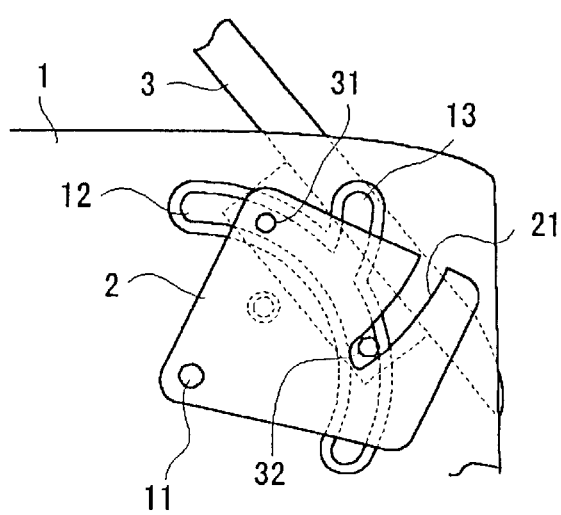
Figure 6D:
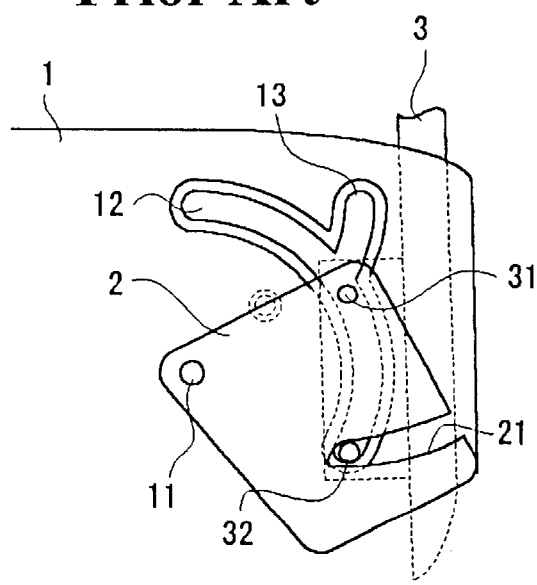

In the closed state, as illustrated in FIG. 3A, the support shafts 31 of the cover 3 are positioned at the upper end portions of the support shaft guide holes 13 due to the urging force of the torsion springs s (not shown in FIGS. 3A through 3E). In this way, the cover 3 is urged in the closing direction, the slide shafts 33 abut the upper ends of the guide holes 53b, and the state in which the cover 3 closes the top surface opening of the receptacle main body 1 is maintained.

From this state, when the cover 3 is pivoted in the opening direction against the urging force of the torsion springs s, as shown in FIG. 3B, the cover 3 pivots clockwise in the figure around the second pivot shafts 32, and the slide shafts 33 accordingly move downward in the guide holes 53b, and the support shafts 31 move downward in the support shaft guide holes 13. Then, when the cover 3 pivots for a predetermined angle around the second pivot shafts 32 and the slide shafts 33 are positioned in the vicinities of the lower ends of the guide holes 53b, as shown in FIG. 3C, the connecting pieces 3b of the cover 3 and the abutment portions 54 of the arm members 51 abut against each other. Thereafter, as shown in FIG. 3D, the arm members 51 pivot clockwise in the figure around the first pivot shafts 52, and the cover 3 accordingly pivots clockwise in the figure around the first pivot shafts 52. As shown in FIG. 3E, the completely open state, in which the cover 3 opens the top surface opening of the receptacle main body 1, is reached. In this case, at the time of the operations from FIG. 3D to FIG. 3E, the urging forces of the torsion springs s are applied in the direction of pivoting the cover 3 in the opening direction. Due to the urging forces, the cover 3 automatically pivots and the completely open state of FIG. 3E is maintained.

When the cover 3, which has been set in the completely open state in this way, is set to the completely closed state, the cover 3 is pivoted in the closing direction. In this case, as shown in FIG. 3D, the arm members 51 are pivoted counterclockwise in the figure around the first pivot shafts 52, and the cover 3 accordingly pivots counterclockwise in the figure around the first pivot shafts 52. Then, when the cover 3 is pivoted by a predetermined angle around the first pivot shafts 52, as shown in FIG. 3B, the abutment of the arm members 51 and the connecting pieces 3b is cancelled. Thereafter, the slide shafts 33 move upwardly in the guide holes 53b, and the cover 3 pivots around the second pivot shafts 32. Then, as shown in FIG. 3A, when the slide shafts 33 are positioned at the uppermost ends of the guide holes 53b, the pivoting operation of the cover 3 around the second pivot shafts 32 stops, and the completely closed state, in which the cover 3 closes the top surface opening of the receptacle main body 1, is reached. In this case, at the time of the operations from FIG. 3B to FIG. 3A, the urging forces of the torsion springs s are applied in the direction of pivoting the cover 3 in the closing direction. Due to the urging forces, the cover 3 is automatically pivoted, and the completely closed state of FIG. 3A is maintained.

In this way, because the mechanism for opening and closing the cover uses two pivot shafts which are the first and second pivot shafts 52, 32, the space required at the time of opening and closing the cover 3 can be reduced, and the space for placement of the receptacle can be made smaller.

In this case, due to the urging forces of the torsion springs s, the positions of the cover 3 with respect to the receptacle main body 1 in the closed state and in the open state are maintained, and rattling of the cover 3 with respect to the receptacle main body 1 can be prevented. Further, after the cover 3 is pivoted by a predetermined angle, the cover 3 is automatically pivoted to the completely open or the completely closed state by the urging forces of the torsion springs s. Thus, the operations of opening and closing the cover 3 can be carried out easily.

Because the first pivot shaft 52 is formed with the cylindrical body having a short axis, the surface area of contact with the pivot hole 11 can be made large. Even in a case in which a large load is applied to the first pivot shafts 52 at the time of opening and closing the cover 3, this load is received over a wide surface areas, and breakage of the first pivot shafts 52 and the pivot holes 11 can be prevented.

In the state in which the abutment portion 54 of the arm member 51 and the connecting piece 3b of the cover 3 abut against one another, the operation of pivoting the cover 3 around the second pivot shafts 32 in the opening direction is limited. Thus, when the load is applied to the cover 3 at the time of pivoting the cover in the opening direction, it is possible to avoid the load to be applied to the slide shafts 33 and the inner peripheral surfaces of the guide holes 53b, so that breakage of the slide shafts 33 and the guide holes 53b can be prevented.

As shown by the large arrow in FIG. 4A, in the work for assembling the mechanism for opening and closing the cover, first, the connecting piece 3b of the cover 3 is inserted between the nipping pieces 53 of the arm member 51. The connecting piece 3b is nipped from both side surfaces thereof by the nipping pieces 53, and the second pivot shaft 32 and the slide shaft 33 provided at the connecting piece 3b of the cover 3 are inserted into the insert-through holes 53a and the guide hole 53b of the arm member 51. In this way, as shown in FIG. 4B, the arm member 51 is attached to the cover 3 so as to be pivotable around the second pivot shaft 32.

Next, as shown by the large arrow in FIG. 4B, the arm member 51 pivotally attached to the cover 3 is inserted into the arm receiving chamber 1b of the receptacle main body 1, respectively. The first pivot shafts 52 of the arm member 51 are inserted into the pivot holes 11 of the arm receiving chamber 1b, and the support shaft 31 of the cover 3 is inserted into the support shaft guide hole 13 of the receptacle main body 1. As shown in FIG. 4C, the arm member 51 is received in the arm receiving chamber 1b, and is attached to the receptacle main body 1 so as to be pivotable around the first pivot shaft 52. In this way, the cover 3 is supported at the receptacle main body 1 so as to be pivotable around the first and second pivot shafts 52, 32. Then, each of the torsion spring s is attached by pivotally supporting one end of the torsion spring s at the projection 12 of the receptacle main body 1, and the other end at the support shaft 31 of the cover 3.

The second pivot shafts 32 and the slide shafts 33 project integrally from the connecting pieces 3b of the cover 3. Further, the first pivot shafts 52 project integrally from the arm members 51. Thus, there is no need to attach the second pivot shafts 32 and the slide shafts 33 to the connecting pieces 3b, and there is no need to attach the first pivot shafts 52 to the arm members 51. The work for attaching the arm members 51 to the cover 3 and the receptacle main body 1 can be carried out easily.

The second pivot shafts 32 and the slide shafts 33 are provided at side surfaces of the connecting pieces 3b of the cover 3. The insert-through holes 53a and the guide holes 53b are provided at the nipping pieces 53 formed at the arm members 51. The first pivot shafts 52 are provided at the arm members 51, and the pivot holes 11 are provided at the pair of wall portions of the arm receiving chambers 1b of the receptacle main body 1. Thus, by the simple operations of inserting the connecting pieces 3b of the cover 3 between the nipping pieces 53 of the arm members 51 and inserting the arm members 51 between the pair of wall portions of the arm receiving chambers 1b of the receptacle main body, the cover 3 can be attached to the receptacle main body 1 so as to be able to pivot around the first and second pivot shafts 52, 32. Accordingly, the work for attaching the cover 3 to the receptacle main body 1 can be carried out easily. In particular, in a receptacle to be set at a place in which the setting work is difficult, such as in the center console or the like in a vehicle, after the arm members 51 are attached in advance to the cover 3, the arm members 51 can be attached to the receptacle main body 1, so that the work for setting the receptacle can be carried out easily.

The mechanism for opening and closing the cover of the present invention is not limited to the above-described embodiment, and appropriate changes may be made provided that they fall within the scope of the present invention. For example, there is no need to provide the torsion springs s which pivotally support the support shafts 31 of the cover 3 and the projections 12 of the receptacle main body 1, provided that the completely open and completely closed states of the cover 3 with respect to the receptacle main body 1 can be maintained and that there is no need to urge the operation of the cover 3 for the predetermined angle or more. In this case, there may have a situation that the cover may rattle with respect to the receptacle main body 1, and it is required to manually pivot the cover 3 to the completely open or the completely closed state. However, in accordance with such a structure, the number of parts forming the mechanism for opening and closing the cover can be reduced even more, and the work for assembling the cover 3 to the receptacle main body 1 can be facilitated.

In the above-described embodiment, the first pivot shafts 52, which pivotally support the arm members 51 to the receptacle main body 1, are formed as cylinders having short axes. However, the first pivot shafts 52 may be formed as small-diameter rods in case that the load applied to the first pivot shafts 52 at the time of pivoting the cover 3 is low or the first pivot shafts 52 are formed from a strong material.

Further, in the above-described embodiment, in the state where the abutment portion 54 of the arm member 51 and the connecting piece 3b of the cover 3 abut against each another, pivoting of the cover 3 in the opening direction around the second pivot shaft 32 is limited. However, it is not absolutely necessary to provide such a structure in which the operational load applied at the time of pivoting of the cover 3 is low, or the slide shaft 33 and the guide hole 53b are formed from strong materials.

In the embodiment described above, in order to move the center of pivoting of the cover 3 from the first pivot shaft 52 to the second pivot shaft 32 and to pivot the cover 3 along a predetermined locus, the support shaft guide hole 13 is formed in the side surface of the receptacle main body 1, and the support shaft 31 is formed at the cover 3. However, in the mechanism for opening and closing the cover of the present invention, the center of pivoting of the cover 3 is moved from the second pivot shaft 32 to the first pivot shaft 52 due to the abutment portion 54 of the arm members 51 and the connecting piece 3b of the cover 3. Thus, it is not absolutely necessary to provide the support shaft guide hole 13 and the support shaft 31.

In the above-described embodiment, the second pivot shaft 32 and the slide shaft 33 are provided at the connecting piece 3b of the cover 3, and the insert-through hole 53a and the guide hole 53b are provided at the nipping piece 53 of the arm member 51. However, the second pivot shaft 32 and the slide shaft 33 may be provided at the nipping piece 53 of the arm member 51, and the insert-through hole 53a and the guide hole 53b may be provided at the connecting piece 3b of the cover 3. Further, the first pivot shafts 52 may be provided at both side walls of the arm receiving chambers 1b, and the pivot holes 11 may be provided in the arm members 51.

What is claimed is:

1. A receptacle comprising:

a receptacle portion having an opening, a cover for covering the opening having a connecting piece, and a pivotal mechanism for opening and closing the opening including a pivoting member situated between the receptacle portion and the cover; a first pivot shaft projecting from one of the pivoting member and the receptacle portion for pivotal connection between the receptacle portion and the pivoting member; a first attachment hole formed in the other of the pivoting member and the receptacle portion for receiving the first pivot shaft; a second pivot shaft projecting from one of the pivoting member and the connecting piece for pivotal connection between the cover and the pivoting member; a second attachment hole formed in the other of the pivoting member and the connecting piece for receiving the second pivot shaft therein; and a pivot limiting device provided between the connecting piece and the pivoting member, and formed of a portion of the connecting piece and a portion of the pivoting member abutting against each other for limiting a pivotal movement around the second pivot shaft to a predetermined angular range so that the cover attached to the receptacle portion through the pivoting member is rotated around the first and second pivot shafts separately to open and close the opening.

2. A receptacle according to claim 1, wherein said one of said second pivot shaft and said second attachment hole is provided on two side surfaces of the connecting piece of the cover, and said other of said second pivot shaft and said second attachment hole is provided on a pair of plate bodies formed on said pivoting member; and one of said first pivot shaft and said first attachment hole is provided on two side surfaces of said pivoting member, and the other of said first pivot shaft and said second attachment hole is provided on a pair of wall portions formed on the receptacle portion.

3. A receptacle according to claim 2, further comprising a sliding shaft formed on one of the pivoting member and the connecting piece, and a guide hole formed in the other of the pivoting member and the connecting piece for limiting rotation between the cover and the pivoting member.

4. A receptacle according to claim 3, further comprising a support shaft formed on a side of the cover, and a support shaft guide hole formed in a side of the receptacle portion for receiving and guiding the support shaft.

5. A receptacle according to claim 1, wherein the mechanism further comprises urging means situated between the cover and the receptacle portion for urging a pivoting operation of the cover with respect to a predetermined angle at a time of opening and closing of the cover.

6. A receptacle according to claim 1, wherein said first pivot shaft is formed from a cylindrical body having a short axis, said first pivot shaft being mounted to pivot about said short axis while an outer peripheral surface of said cylindrical body slides along an inner peripheral surface of said attachment hole.

7. A receptacle according to claim 1, wherein said receptacle portion is a storage compartment or a cup holder in a vehicle.

* * * * *